United States Patent
Blankers

[11] Patent Number: 5,994,846
[45] Date of Patent: Nov. 30, 1999

[54] BUCK CONVERTER SWITCHING SCHEME

[75] Inventor: Hendrik J. Blankers, Eindhoven, Netherlands

[73] Assignee: U.S. Philips Corporation, New York, N.Y.

[21] Appl. No.: 08/723,634

[22] Filed: Oct. 3, 1996

[30] Foreign Application Priority Data

Oct. 9, 1995 [EP] European Pat. Off. .............. 95202701

[51] Int. Cl.[6] .................................................. H05B 41/36
[52] U.S. Cl. ................................ 315/209 R; 315/DIG. 5; 315/291; 315/82
[58] Field of Search ......................... 363/21; 315/DIG. 7, 315/209 R, 247, 307, DIG. 5, 291, 82; 323/222

[56] References Cited

U.S. PATENT DOCUMENTS

| | | | |
|---|---|---|---|
| 4,412,154 | 10/1983 | Klein | 315/224 |
| 5,036,254 | 7/1991 | Shimizu | 315/219 |
| 5,068,572 | 11/1991 | Blankers | 315/209 R |
| 5,170,333 | 12/1992 | Niwayama | 363/21 |
| 5,319,286 | 6/1994 | Leyten | 315/289 |
| 5,420,777 | 5/1995 | Muto | 363/21 |

*Primary Examiner*—Arnold Kinkead
*Attorney, Agent, or Firm*—Bernard Franzblau

[57] ABSTRACT

An arrangement for igniting and operating a high intensity discharge lamp including a Buck converter. The Buck converter includes a switch, a rectifier and an inductor. The converter is connected to input terminals for connection to a supply source and output terminals for supplying the lamp with a current through periodic swithing of the switch alternately into a conducting and a non-conducting state. The Buck converter operates in a self-oscillatory mode during stable lamp opertion. The arrangement further includes circuitry for causing the Buck converter to operate in a forced oscillatory mode in dependence on the lamp condition.

6 Claims, 2 Drawing Sheets

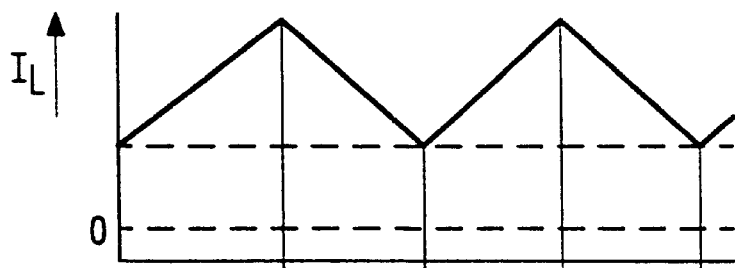
FIG. 3A
FIG. 3B
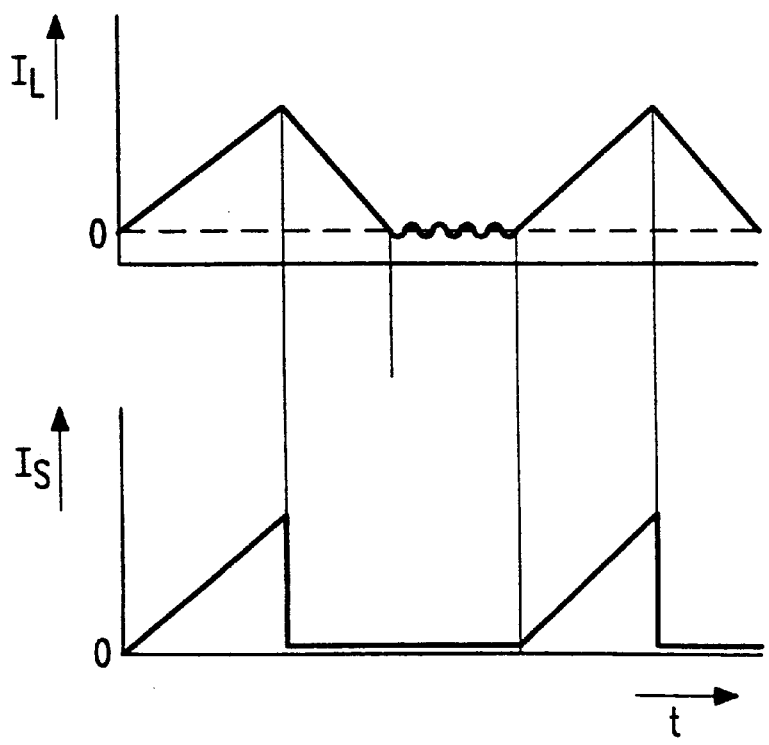
FIG. 4A
FIG. 4B

BUCK CONVERTER SWITCHING SCHEME

The invention relates to a circuit arrangement for igniting and operating a high-pressure discharge lamp, provided with switching means, inductive means, and rectifying means together forming a Buck converter connected to input terminals for connection to a supply source and output terminals for connection of the means comprising the lamp so as to supply the lamp with a current through periodic switching of the switching means alternately into a conducting and a non-conducting state, the Buck converter operating in a self-oscillatory mode when the lamp is in a condition corresponding to stable lamp operation.

A circuit arrangement of the kind mentioned in the opening paragraph is known from EP-A-4001931=U.S. Pat. No. 5,068,572. The known circuit arrangement is particularly suitable for igniting and operating a high-pressure discharge lamp which forms part of a projection TV installation.

The Buck type of switch mode power supply is also known under other names such as downconverter, step-down converter, inductor-coupled step-down converter, direct-down converter.

Although in general the input terminals and output terminals in a Buck converter are in direct electrical connection with one another, it is equally well possible for the circuit to be provided with an electrical separation between input and output terminals, for example, in the form of a transformer.

In the known circuit arrangement, the Buck converter operates in a self-oscillatory mode which is characterized by the fact that the process of switching the switching means from the non-conducting to the conducting state is initiated the moment the current through the inductive means has become zero, whereupon switching takes place immediately.

It is possible with the known circuit arrangements to supply a substantially constant power to the connected lamp over a wide current and voltage range, so that a highly constant luminous flux is generated by the lamp. The self-oscillatory mode is characterized by low switching losses in the periodic switching of the switching means, especially in the current-voltage range where stable lamp operation obtains. Preferably, the downconverter is so dimensioned that switching from the non-conducting to the conducting state takes place during stable lamp operation with a frequency which lies above the limit of human hearing. This also means that the dimensions of the inductive means can remain comparatively small.

In the known circuit arrangement, switching from the conducting to the non-conducting state takes place when a signal proportional to the current through the inductive means becomes equal to a separately set control signal. Control of the power supplied to the lamp is possible through a control of the current through the output terminals of the circuit arrangement, for example in dependence on the voltage across the output terminals. Although a controlled current source of comparatively simple construction is realized by means of the known circuit arrangement, with which also the power dissipated in a load (the lamp) can be controlled, the known circuit arrangement does have a number of disadvantages.

It is found under certain circumstances in the known circuit arrangement that the frequency with which the switching means are switched can assume comparatively very high or comparatively very low values. The high and low switching frequencies occur especially during the ignition phase, i.e. a lamp condition preceding the condition of stable lamp operation.

A result of the comparatively high switching frequencies is a strong rise of the switching losses, which may even lead to the switching means becoming defective. The occurrence of the comparatively low switching frequencies lead to the problem of noise pollution because the switching frequency may enter the range of human hearing.

The invention has for its object to provide a circuit arrangement with which the above disadvantages are eliminated to a high degree. According to the invention, a circuit arrangement of the kind mentioned in the opening paragraph is for this purpose characterized in that the circuit arrangement is provided with means for causing the Buck converter to operate in a forced oscillatory mode in dependence on the lamp condition.

The use of a forced switching mode offers the possibility of causing the downconverter to function in dependence on the lamp condition, i.e. in a manner corresponding to the voltage at the output terminals, whereby at the same time the occurrence of very low and/or very high switching frequencies of the switching means can be avoided.

Preferably, the means provide for an operation of the Buck converter in a discontinuous mode when the lamp condition corresponds to a condition preceding the occurrence of an arc discharge in the lamp. Preferably, the means provide for operation of the Buck converter in a continuous mode when the lamp condition corresponds to the condition in which an arc discharge has formed after breakdown in the lamp, preceding the condition of stable lamp operation.

The following may serve as an explanation. The concept "forced oscillatory mode" in relation to the Buck converter in the present description and claims is understood to refer to those modes in which switching of the switching means from the non-conducting to the conducting state is not triggered by the fact that the current through the inductive means becomes zero.

Two types of forced oscillatory modes can be distinguished:
continuous mode
discontinuous mode.

In the continuous mode, a current flows continuously through the inductive means, so also during switching of the switching means from the non-conducting to the conducting state. When the circuit arrangement operates in the continuous mode, the ripple in the current through the load connected to the output terminals is comparatively small, and the load can be supplied with a comparatively strong current. Since the switching means switch a comparatively strong current from the non-conducting to the conducting state under these circumstances, the switching losses are correspondingly high.

In the discontinuous mode of operation of the circuit arrangement, the current through the inductive means does become zero, but the process of switching of the switching means from the non-conducting state to the conducting state is not triggered thereby. Although it is possible for the current through the inductive means to remain zero in the subsequent time period up to the moment the switching means are made conducting, the construction of practical realizations of the circuit arrangement will often comprise a secondary circuit of which the inductive means form part and which acts as a tuned circuit in the subsequent period. A suitable choice of the moment at which switching to the conducting state takes place after said subsequent period has elapsed renders it possible to have this switching take place with low switching losses. The ripple in the current through the connected load branch may be comparatively great, and the voltage across the load branch may be comparatively high when the circuit arrangement operates in the discontinuous mode.

The following lamp conditions can be distinguished in the ignition and operation of a high-pressure discharge lamp:
- extinguished, non-ignited lamp,
- breakdown in the lamp followed by a glow discharge, and transition from glow discharge to arc discharge,
- run-up of the lamp,
- stable lamp operation.

No electric conduction takes place in the lamp in the extinguished, non-ignited state. The voltage across the lamp is equal to the external supply voltage applied to the lamp.

When a high-voltage pulse, called ignition pulse, is generated across the lamp, breakdown will take place in the lamp so that electric conduction in the form of a glow discharge will arise in the lamp, which in its turn will change into an arc discharge given a sufficient current supply. The voltage across the discharge (the lamp voltage), and accordingly the voltage across the lamp, abruptly drops to a few volts owing to the conduction in the lamp caused by the breakdown.

The run-up of the lamp is the lamp condition in which an arc discharge caused by ignition develops into the condition of stable lamp operation. The voltage gradually rises during the run-up. The run-up is initially accompanied by a strong current through the lamp, which gradually decreases as the arc voltage increases. To prevent an excessive load on the lamp, it is desirable under certain conditions to limit the current value to a maximum and thus control the power supplied to the lamp and have this power rise only slowly.

In the stable operational condition, the lamp has a stable lamp voltage which is in accordance with the power consumed by the lamp and the thermodynamic balance prevailing in the lamp.

In the extinguished, non-ignited condition of the lamp, a comparatively high voltage at the output terminals of the circuit arrangement is favorable for a quick and reliable ignition of the connected lamp. Since the lamp is non-conducting in this condition, the occurrence of a strong current ripple at the output terminals is no great disadvantage. The operation of the circuit arrangement in the discontinuous mode is accordingly very suitable for this lamp condition.

During lamp run-up, it is initially important to supply the lamp with a comparatively strong current with the object of having the lamp reach its stable operational condition quickly and reliably. Operation of the circuit arrangement in the continuous mode is highly suitable for this at least in the initial phase of the run-up. The comparatively high switching losses occurring in the continuous mode do not constitute a major negative factor here because the run-up of the high-pressure discharge lamp is of a limited, comparatively short duration.

The circuit arrangement according to the invention is particularly suitable for use in a projection TV installation. The circuit arrangement may also be advantageously used in a motorcar headlight system. Both applications involve the ignition and operation of a high-pressure discharge lamp of very compact shape which in the stable operational condition is to supply a highly constant luminous flux and has a high ignition voltage. After breakdown, it is of the greatest importance, especially for a motorcar headlight system, that light should be emitted very quickly, and thus that the run-up to the stable operational condition takes place within a short period.

In the projection TV application, a limitation of the maximum current through the inductive means with the circuit arrangement operating in the continuous mode will often be provided with the purpose of preventing an overload on the lamp.

It is possible to control the switching means for switching from the non-conducting to the conducting state by means of a control signal generated on the basis of detection of, for example, the voltage across the lamp, the current through the lamp, or combinations thereof, with the circuit arrangement operating in the continuous mode or the discontinuous mode.

In a practical circuit arrangement, the control signal for switching the switching means from the non-conducting to the conducting state is generated on the basis of a time signal when the circuit arrangement is operating in the continuous or discontinuous mode. The time signal here is preferably related to the time interval elapsed since the moment the switching means entered the non-conducting state. The advantage of this is that it renders possible a considerable simplification in the construction of the circuit arrangement. A spread in the value of the stable lamp operation of individual lamps is found not to be of essential importance. The run-up of the lamp will continue until the stable operating condition is reached also after the transition of the operation of the circuit arrangement from the continuous to the self-oscillatory mode. Preferably, a constant-power control is operative then while the circuit arrangement is in the self-oscillatory mode.

During operation in the self-oscillatory mode, the control signal for switching from the non-conducting to the conducting state is realized in the known circuit arrangement in that the current in the inductive means changes polarity after becoming zero and generates an auxiliary voltage across the inductive means, which auxiliary voltage serves as a voltage source for generating the control signal for switching the switching means to the conducting state. This does form a reliable and well-functioning construction of the circuit arrangement in practical embodiments, but it is only one among many possible realizations known from practice and the literature. In many cases, the current through the inductive means increases again substantially instantaneously and without polarity change in that the switching means enter the conducting state.

The brief polarity change of the current through the inductive means described above is of such a small duration and value in practice that it may be disregarded hereinafter and that the current gradient through the inductive means after the current has become zero may be regarded as an instantaneous increase in the current through the inductive means owing to switching of the switching means to the conducting state.

The above and further aspects of the invention will be explained in more detail below with reference to a drawing, in which FIG. 1 is a diagram of an embodiment of a circuit arrangement according to the invention;

FIG. 3 shows the current as a function of time in parts of a practical realization of the circuit arrangement during operation in a continuous mode; and FIG. 4 shows the current as a function of time through parts of a practical realization of the circuit arrangement during operation in a discontinuous mode.

Figure 1:
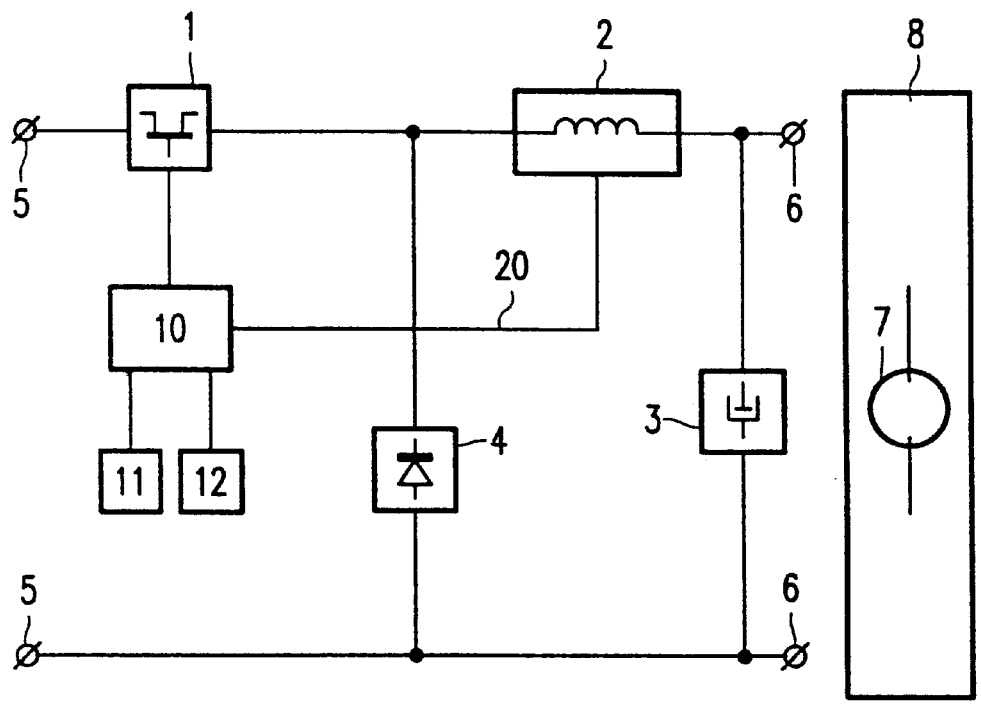

FIG. 1 is a diagram of a circuit arrangement for igniting and operating a high-pressure discharge lamp 7, provided with switching means 1, inductive means 2, and rectifying means 4 together forming a Buck converter, connected to input terminals 5 for connection to a supply source and output terminals 6 for connection of the means 8 comprising the lamp 7 so as to supply the lamp with a current in that the switching means are periodically switched alternately into a conducting and a non-conducting state, with the Buck converter operating in a self-oscillatory mode when the lamp is in a state corresponding to stable lamp operation. The Buck converter is also provided with capacitive buffer means 3.

The circuit arrangement is provided with a control circuit 10 for controlling the switching means 1, which control circuit generates a control signal for switching the switching means alternately to the conducting and the non-conducting state.

The means 8 comprising the lamp in many practical cases comprise a commutator circuit for causing a current of periodically changing polarity to flow through the lamp during lamp operation. The means 8 in general also comprise an igniter circuit for generating a voltage pulse for igniting the lamp. Both the commutator circuit and the igniter circuit will generally form part of the circuit arrangement according to the invention. Commutator means may be omitted in the case of a lamp which is to be operated at a DC voltage.

The circuit arrangement is provided with means 11 for having the Buck converter operate in a discontinuous mode in the lamp condition preceding the occurrence of an arc discharge in the lamp.

Means 12 cause the Buck converter to operate in a continuous mode when the lamp condition corresponds to the condition in which an arc discharge has been formed after breakdown in the lamp, but preceding the condition of stable lamp operation.

The means 11 and 12 thus together form the means for making the Buck converter operate in a forced oscillatory mode in dependence on the lamp condition, and are for this purpose connected to the control circuit 10.

Reference numeral 20 denotes a coupling between a detection of the current through the inductive means 2, in particular detection that this current has become zero on the one hand, and the control circuit 10 on the other hand, which coupling serves to initiate the process of switching the switching means from the non-conducting to the conducting state in the control circuit when the circuit arrangement is in the self-oscillatory mode.

The control circuit 10 comprises means (not shown) for generating a control signal in a manner known per se for switching the switching means from the conducting to the non-conducting state. In the embodiment described, this is so arranged that a constant-power control is operative for the power supplied to the output terminals 6 when the circuit arrangement is operating in the self-oscillatory mode.

In a practical realization of the embodiment of the circuit arrangement described, the control signal for switching the switching means from the non-conducting to the conducting state is generated in a manner similar to that known from the circuit arrangement of EP-A-0 401 931 with the circuit arrangement operating in the self-oscillatory mode.

The means 11 and 12 in this practical realization of the circuit arrangement are formed such that each generates a time signal related to the time interval which has elapsed since the moment the switching means entered the non-conducting state. The means 11 are so constructed that the switching means cannot be switched to the conducting state until after a minimum time interval. The means 12 are so arranged that the switching means are switched to the conducting state after a maximum time interval.

The minimum time interval provided by the means 11 in the practical realization described is 5 $\mu$s. The maximum time interval realized by the means 12 is 36 $\mu$s.

Figure 2A:
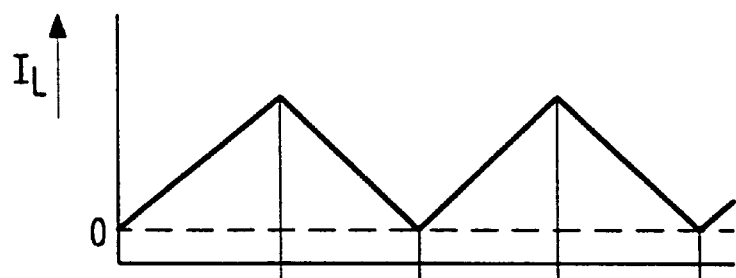
FIG. 2 shows the current as a function of time in parts of a practical realization of the circuit arrangement during operation in a self-oscillatory mode.
Figure 2B:
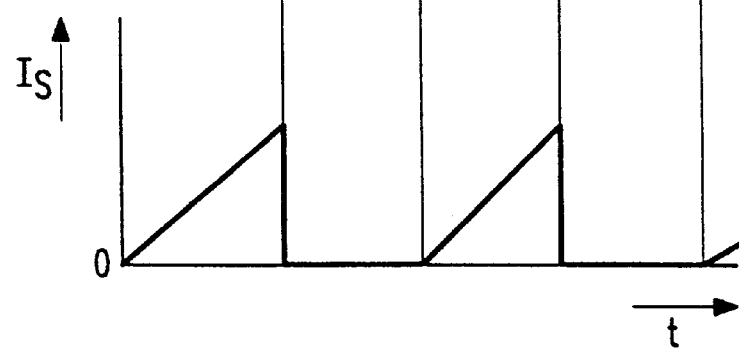

FIGS. 2, 3 and 4 show both the current through the inductive means $I_L$ and the current through the switching means $I_S$ as a function of time for the practical realization of the embodiment of the circuit arrangement described. FIG. 2 relates to the self-oscillatory mode, FIG. 3 to the continuous mode, and FIG. 4 to the discontinuous mode.

The practical realization of the circuit arrangement is suitable for connection to a supply source of 220 V, 50 Hz. The circuit arrangement is for this purpose provided with a portion (not shown and known per se) between the input terminals and the switching means for converting the AC voltage connected to the input terminals to a suitable DC voltage for operating the switching means.

The practical realization of the circuit arrangement described is suitable for operating a type UHP high-pressure metal halide lamp, make Philips. The lamp has a power rating of 100 W for a nominal lamp voltage of 85 V and a lamp current of 1.2 A. A type IRF840 MOSFET, make International Rectifier, serves as the switching means 1. The inductive means 2 are formed by a transformer with a ferrite core, a primary winding of 100 turns and a secondary winding of 30 turns, forming part of the control circuit 10 and serving as a voltage source for generating the control signal for switching the switching means to the conducting state. The capacitive buffer means 3 have a capacitance value of 0.82 $\mu$F. The rectifying means 4 are formed by a type BYV29F500 diode, make Philips. The circuit arrangement is then capable of supplying a constant power to the output terminals over a range from 50 to 110 V, with the Buck converter operating in the self-oscillatory mode.

In the extinguished, non-ignited lamp condition, the circuit arrangement operates in the discontinuous mode. The voltage across the output terminals is 160 V. An igniter circuit (not shown) generates an ignition pulse of 20 kV, whereupon the lamp will ignite.

The voltage across the lamp drops to 15 V, and thus also the voltage across the output terminals, the moment the lamp condition with an arc discharge in the lamp has been reached. The circuit arrangement then abruptly changes from the discontinuous mode to the continuous mode. A current limited to a maximum value of 2 A is then supplied to the lamp. The lamp voltage gradually rises during the run-up of the lamp, and the current through the lamp decreases. This manifests itself in a quicker drop of the current through the inductive means during the non-conducting periods of the switching means.

The operation of the circuit arrangement switches from the continuous mode to the self-oscillatory mode the moment the current through the inductive means becomes zero within 36 $\mu$s with the switching means in the non-conducting state. The circuit arrangement is provided with means for controlling the power supplied to the output terminals to a constant level.

In the practical realization described, this corresponds to a voltage across the lamp and across the output terminals of 50 V. Subsequently, the lamp run-up continues until the lamp voltage has reached the stable level, and thus the condition of stable lamp operation. A constant-power control causes the lamp to reach its stable operational state at a nominal lamp voltage of 85 V.

The period during which the switching means are in the non-conducting state is approximately 18 $\mu$s when stable lamp operation takes place at the rated lamp power.

I claim:

1. A circuit arrangement for igniting and operating a high-pressure discharge lamp, comprising:

a Buck converter including switching means, inductive means and rectifying means for supplying the lamp with a current through periodic switching of the switching means, the Buck converter operating in a self-oscillatory mode when the lamp is in a condition corresponding to stable lamp operation and characterized by means for operating the Buck converter in a substantially discontinuous mode prior to arc discharge of the lamp and in a substantially continuous mode between arc discharge and stable lamp operation.

2. The circuit arrangement as claimed in claim 1, wherein the circuit arrangement is in combination with a high-pressure discharge lamp which forms part of a projection TV installation.

3. The circuit arrangement as claimed in claim 1, wherein the circuit arrangement forms part of a motorcar headlight system.

4. A method for igniting and operating a high-pressure discharge lamp, comprising supplying the lamp with current through periodic switching of a switch within a Buck converter wherein the Buck converter operates in a self-oscillatory mode when the lamp is operating in a stable operating condition, operates in a substantially discontinuous mode prior to arc discharge of the lamp and operates in a substantially continuous mode between arc discharge and stable lamp operation.

5. The method of claim 4, further including incorporating the lamp as part of a projection TV installation.

6. The method of claim 4, further including incorporating the Buck converter as part of a motorcar headlight system.

\* \* \* \* \*